United States Patent

[11] 3,614,460

| [72] | Inventors | David A. Hale<br>6222 Dawler St., Pine Lawn, Mo. 63121;<br>Earl R. Housman, 5814 Dressell Ave., St.<br>Louis, Mo. 63120 |
|---|---|---|
| [21] | Appl. No. | 887,456 |
| [22] | Filed | Dec. 22, 1969 |
| [45] | Patented | Oct. 19, 1971 |

[54] ANTITHEFT DEVICE
5 Claims, 1 Drawing Fig.

| [52] | U.S. Cl. | 307/10, 180/114, 340/64 |
|---|---|---|
| [51] | Int. Cl. | H02g 3/00 |
| [50] | Field of Search | 307/10; 180/114; 340/64 |

[56] References Cited
UNITED STATES PATENTS
3,158,749  11/1964  McAllister................  307/10 AT

*Primary Examiner*—Herman J. Hohauser
*Attorney*—Gravely, Lieder & Woodruff

ABSTRACT: An antitheft device for an automotive vehicle includes a relay switch having contactors which are interposed in conductors extending between the ignition switch and the induction coil and between the induction coil and the breaker points. When the ignition switch is closed and the coil of the relay switch is energized, its contactors shift and complete a circuit between the battery and breaker points. On the other hand, when the ignition switch is open, the relay coil is deenergized and one of the contactors places a terminal of the induction coil in electrical connection with an alarm device so that when a jumper wire is connected between the induction coil and the battery, the alarm will sound, but the breaker points will remain electrically isolated from the induction coil.

PATENTED OCT 19 1971
3,614,460
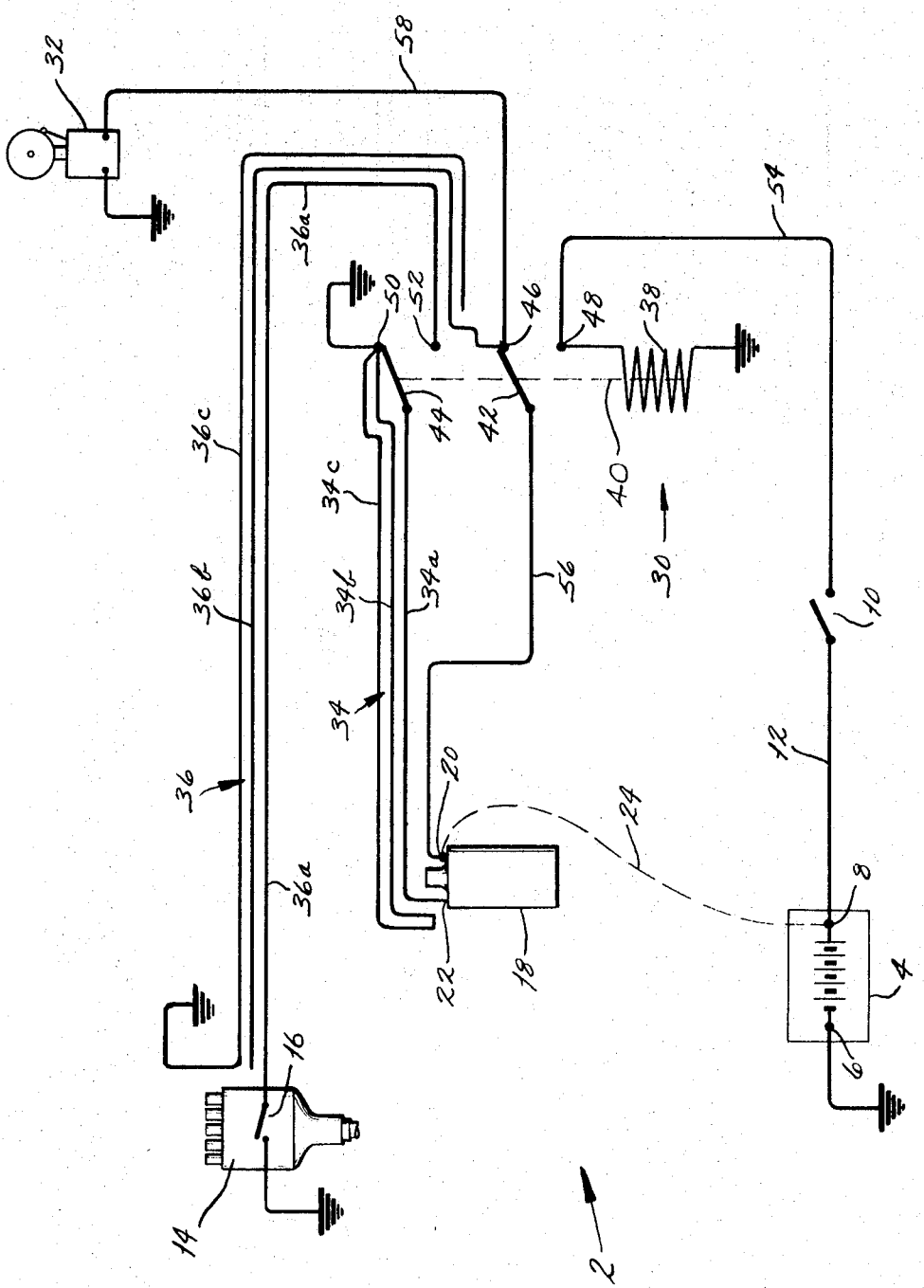
INVENTORS
DAVID A. HALE
EARL R. HOUSMAN
BY *Gravely, Lieder & Woodruff*
ATTORNEYS

ANTITHEFT DEVICE

BACKGROUND OF THE INVENTION

The invention relates in general to automotive vehicles, and more particularly to an antitheft device for automobiles.

The incidence of automobile thefts has increased considerably in recent years, and this increase is attributable to the relative ease with which automobiles may be started and operated without their ignition switch keys. The common procedure for starting an automobile involves simply lifting the hood, running a wire from the so-called hot terminal of the battery to the primary winding of the induction coil, and then shorting out the terminals of the starter solenoid with a pliers. Thus, the thief from within the confines of the engine compartment effectively bypasses both the ignition switch and the starter switch which are normally operated by the turn of a single key.

SUMMARY OF THE INVENTION

One of the principal objects of the present invention is to provide an antitheft device for rendering the ignition system of an automobile inoperative when the ignition switch is turned off so that the automobile's engine cannot be operated by running a jumper wire directly from the battery to the induction coil. Another object is to provide an antitheft device of the type stated which energizes an alarm device when anyone attempts to run a wire directly from the battery to the induction coil. A further object is to provide an antitheft device of the type stated which is easily installed on automobiles of current manufacture and can be supplied in kit form. Still another object is to provide an antitheft device which renders the circuitry of an automotive ignition system difficult to trace. These and other objects and advantages will become apparent hereinafter.

The present invention is embodied in an antitheft device for an automotive vehicle and includes a relay switch interposed between the induction coil and ignition switch and between the induction coil and the breaker points. When the relay switch is energized, it completes a circuit from the ignition switch to the induction coil and thence to the breaker points. However, when the relay switch is deenergized, it places the induction coil in circuit with an alarm device. The invention also consists in the parts and in the arrangements and combinations of parts hereinafter described and claimed.

DESCRIPTION OF THE DRAWING

The accompanying drawing is an electrical schematic diagram of an automotive ignition system having incorporated therein an antitheft device constructed in accordance with an embodying the present invention.

DETAILED DESCRIPTION

Referring now to the drawing, 2 designates a portion of an automotive ignition system having the antitheft device of the present invention incorporated into it. The ignition system 2 has the usual components including a battery 4 provided with a grounded terminal 6 and a so-called hot terminal 8, the latter of which is connected to a conventional ignition switch 10 through a wire 12. The ignition switch 10 is preferably key operated and is located within the interior of the vehicle. The ignition system 2 also includes a distributor 14 having breaker points 16, and an induction coil 18, the primary winding of which terminates at a pair of terminals 20 and 22.

In conventional ignition systems, the terminal 20 of the induction coil 18 is connected directly with the ignition switch 10, while the terminal 22 is connnected directly to the breaker points 16 in the distributor 14. Consequently, when the switch 10 is closed, the primary winding of the induction coil 18 is placed across the terminals 6 and 8 of the battery 4 through the breaker points 16, and as the points 16 open and close, a magnetic field alternately collapses and builds up in the induction coil 18.

The common procedure for stealing an automobile involves nothing more than lifting the hood and connecting a thin jumper wire 24 (shown as a dotted line) between the hot terminal 8 of the battery 4 and the terminal 20 of the induction coil 18. This bypasses the ignition switch 10 located within the interior of the vehicle and places the primary winding of the coil 18 and the breaker points 16 in the distributor 14 across the terminals 6 and 8 of the battery 4. Then the thief shorts out the terminals on the solenoid switch for the starter with a heavy piece of wire or the handles of a pliers so as to energize the starter and crank the engine. Thus, it is a simple matter to steal automobiles of current manufacture.

The efforts of automobile thieves are thwarted by incorporation of an antitheft device of the present invention into the ignition system 2, and, broadly speaking, that antitheft device includes a relay switch 30, a bell 32 or some other type of electrically operated alarm device, and a pair of triple wire cables 34 and 36 connecting the relay switch 30 with the induction coil 18 and the distributor 14. More specifically, the relay switch 30 includes a relay coil 38 which operates an armature 40, and the armature 40, in turn, moves a pair of contactors 42 and 44 in unison. The contactor 42 shifts between a pair of contacts 46 and 48, while the contactor 44 concurrently shifts between contacts 50 and 52. In other words, the contactor 42 is on the contact 46 when the contactor 44 is on the contact 50 and, conversely, when the contactor 42 is on the contact 48 the contactor 44 is on the contact 52. The armature 40 is spring biased outwardly so that the contactors 42 and 44 normally engage the contacts 46 and 50, respectively. One end of the relay coil 38 is grounded while the opposite end is connected with the contact 44, and that contact in turn is connected to the switch 10 through a wire 54. Consequently, when the ignition switch 10 is closed, the relay coil 38 is energized and the armature 40 is drawn inwardly into the coil 38.

The triple wire cable 34 includes individual conductors 34a, 34b and 34c which extend substantially the entire length thereof and are insulated from one another as well as from the surrounding components of the automobile. All conductors 34a, 34b, and 34c are preferably contained in a metal sheath forming part of the cable 34. Likewise, the cable 36 includes three individual-insulated conductors 36a, 36b and 36c which are also preferably contained in a metal sheath. The conductors 34a, b, c and 36a, b, c should not be colored or otherwise coded. While in the drawing the conductors in cables 34 and 36 are illustrated side-by-side for convenience of description, in actual practice the cables 34 and 36 are preferably of the coaxial variety.

The conductor 34a of the triple wire cable 34 connects at its one end with the terminal 22 of the induction coil 18 and at its opposite end with the contactor 44 of the switch 50. The other conductors 34b, c remain unattached at their ends located at the induction coil 18, but their opposite ends are connected with the contact 50 of the switch 30, and that contact 50 is grounded. The metal sheath surrounding the conductors 34a, b, c is also grounded. The other terminal 20 of the induction coil 18 has a single insulated wire 56 attached to it, and that wire is connected with the contactor 42 at its opposite end.

Insofar as the other triple wire cable 36 is concerned, its conductor 36a interconnects the breaker points 16 of the distributor 14 and the contact 52 of the switch 30. The conductors 36b, of that cable is connected at one end to the contact 46 of the switch 30, while its opposite end remains unattached but insulated adjacent to or within the distributor 14. The conductor 36c, on the other hand, is grounded adjacent to or within the distributor 16, but its other end remains insulated at the relay switch 30. The metal sheath surrounding the conductors 36a, b, c is grounded.

Finally, the bell 32 has one of its terminals grounded and its other terminal connected to the contact 46 of the switch 30 through a wire 58.

OPERATION

When the authorized operator of the automobile having the antitheft device of the present invention incorporated into its ignition system 2 inserts the correct key into the ignition switch 10 and turns that key, the switch 10 will close and place the coil 38 of the relay switch 30 across the battery 4. The coil 38 will thereupon draw the armature 40 inwardly and shift the contactor 42 from the contact 46 to the contact 48 and likewise the contactor 44 from the contact 50 to the contact 42. Since the contact 48 is connected to the hot terminal 8 of the battery through the wires 12 and 54 and switch 10, the induction coil terminal 20 will also be placed at the potential of the battery terminal 8 inasmuch as it is now connected to the contact 48 through the contactor 52 and wire 56. On the opposite side of the induction coil 18, the terminal 22 thereof is connected to the breaker points 16 within the distributor 14 through the conductor 34a and 36a and the contactor 44 which completes the circuit between those conductors when the relay coil 38 is energized.

Thus, when the ignition switch 10 is closed, the breaker points 16 of the distributor 14 and the primary winding of the induction coil 18 are placed in series across the terminal 6 and 8 of the battery 4, and accordingly they operate in the usual manner. However, when the ignition switch 10 is opened, the foregoing circuit is interrupted on each side of the induction coil 10 by the relay switch 30. In particular, the connection between the formerly connected conductors 34a and 36a of the triple wire cables 34 and 36 is broken at the contactor 44, and likewise the connection between the wires 54 and 56 is disrupted at the contactor 42.

Should a thief attempt to run a jumper wire 24 between the hot terminal 8 of the battery 4 and the terminal 20 of the induction coil 18 to bypass the ignition switch 10 as is the common practice in stealing automobiles, he will merely succeed in placing the bell 32 in circuit with the battery 4. In particular, when the thief installs the jumper wire 24, the bell 32 will be connected to the hot terminal 8 of the battery through the wire 58, the contactor 42, the wire 56, and of course the jumper wire 24. The breaker points 16 will remain electrically isolated from the terminal 22 of the induction coil 18 due to the disposition of the contactor 44 against the contact 50. Accordingly, the bell 32 will ring, but the automobile engine will not start. The ringing bell 32 should be enough to discourage any thief and cause him to flee, but if he persists anyway, he will not succeed in starting the automobile by reason of the fact that the contactor 44 disrupts the circuit between the breaker points 16 and the induction coil 18.

Should the thief connect his jumper wire 24 to the terminal 22 instead of the terminal 20 then he will merely ground the hot terminal 8 since the contact 50 against which the contactor 44 bears is grounded. In other words, when the ignition switch 10 is open the terminal 22 is grounded through the conductor 34a and the contactor 44, and when the jumper wire 24 is installed between that terminal 22 and the hot terminal 8 of the battery a short circuit is created, which will probable destroy the jumper wire 24.

If the thief recognizes that the terminal 22 of the induction coil 18 is not wired in the conventional manner and attempts to bypass the switch 30 by cutting the cables 34 and 36 intermediate their ends and then splicing the proper conductors therein together, he will probably become confused inasmuch as each cable 34 and 36 contains three uncoded conductors in addition to a metal sheath. Furthermore, if the jumper wire 24 is connected to the terminal 22 so as to energize the conductor 34a and that conductor is spliced to the near end of the conductor 36b, the bell 32 will be energized and will sound an alarm. If the conductor 34a is connected to the conductor 36c the circuit will be grounded. Also if the cables 34 or 36 are cut, the chances are good that the conductors 34a, b, c or 36a, b, c therein will become entangled with each other or with the metal sheaths, particularly when the cables 34 and 36 are of the coaxial variety, and this will render the ignition system 2 inoperative.

The relay switch 30 should be installed in some location where the thief cannot gain easy access to it. This location should furthermore be remote from the engine compartment so that the wiring to the switch 30 cannot be traced without the aid of a continuity tester. Behind the dashboard or within the trunk compartment represent ideal locations for the relay switch 30.

Since the antitheft device comprises relatively few components, it may be supplied in kit form for installation on automobiles having their ignition systems wired in the conventional manner. Similarly, it may be easily installed on new automobiles during assembly.

In lieu of connecting the wire 58 with the bell 32 it may instead be connected to the horn so that the vehicles horn is energized upon placement of a jumper wire 24.

This invention is intended to cover all changes and modification of the example of the invention herein chosen for purposes of the disclosure which do not constitute departures from the spirit and scope of the invention.

What is claimed is:

1. In an automotive vehicle including a battery having first and second terminals an ignition switch connected to the first terminal of the battery, a breaker point switch which is connected to the second terminal of the battery, and an induction coil having a primary winding; and antitheft device comprising a relay switch connected to the ignition switch and including a relay coil and contactor means which moves between first and second positions, the relay coil being connected between the second battery terminal and the ignition switch so that when the ignition switch is closed the relay coil is energized, the contactor means being spring biased toward the second position but being moved to the first position by the relay coil when the relay coil is energized, whereby the contactor means will be in its first position when the ignition switch is closed and in its second position when the ignition switch is open; first conductor means interconnecting the relay switch and one end of the primary winding for the induction coil; second conductor means interconnecting the other end of the primary winding and the breaker point switch; an alarm connected to the second terminal of the battery, and third conductor means interconnecting the alarm and the relay switch; the first conductor means, the alarm, and the ignition switch all being connected to the relay switch such that the first conductor means and the ignition switch are electrically connected by the contactor means when the contactor means is in its first position but are disconnected when the contactor means is in its second position and such that the first conductor means and the alarm are electrically connected by the contactor means when the contactor means is in its second position but are disconnected when the contactor means is in its first position.

2. The structure according to claim 1 wherein the second conductor means is formed in two segments, one of which is connected between the primary winding of the induction coil and the relay switch and the other of which is connected between the relay switch and the breaker point switch; wherein the second terminal of the battery is connected to the relay switch; wherein the relay switch further includes second contactor means which moves between first and second position, the second contactor means being spring biased toward the second position and being moved to the first position when the coil is energized, whereby when the ignition switch is closed the second contactor means will be in its first position and when the ignition switch is open the second contactor means will be in its second position; and wherein the two segments of the second conductor means and the second terminal of the battery are all connected to the relay switch such that the two segments of the second conductor means are electrically connected by the second contactor means when the second contactor means is in its first position and such that the segment extending between the primary winding and the relay switch is connected with the second terminal of the battery by the second contactor means when the second contactor means is in its second position.

3. The structure according to claim 1 wherein the second conductor means is formed in two segments, one of which is connected between primary winding of the induction coil and the relay switch and the other of which is connected between the relay switch and the breaker point switch; wherein the relay switch further includes second contactor means which moves between first and second positions, the second contactor means being spring biased toward the second position and being moved to the first position by the relay coil when the relay coil is energized, whereby when the ignition switch is open the second contactor means will be in its second position and when the ignition switch is closed the second contactor means will be in its first position, the two segments of the second conductor means being connected to the relay switch such that they are connected by the second contactor means when the second contactor means is in its first position and are disconnected when the second contactor means is in its second position.

4. The structure according to claim 3 wherein the segment of the second conductor means located between the breaker point switch and the relay switch is one conductor of a cable having a plurality of individual conductors insulated from each other; and wherein the conductors other than the conductor forming the second conductor means are connected with the alarm.

5. The structure according to claim 3 wherein the segment of the second conductor means located between the primary winding and the relay switch is one conductor of a cable having a plurality of individual conductors; and wherein the conductors other than the conductor forming the second conductor means are connected to the second terminal of the battery.